(12) United States Patent
Nakata et al.

(10) Patent No.: US 11,821,512 B2
(45) Date of Patent: Nov. 21, 2023

(54) PARK LOCK MECHANISM

(71) Applicants: JATCO Ltd, Fuji (JP); NISSAN MOTOR CO., LTD., Yokohama (JP)

(72) Inventors: Hitoshi Nakata, Isehara (JP); Toshihiko Watanabe, Isehara (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 13 days.

(21) Appl. No.: 17/639,190

(22) PCT Filed: Nov. 6, 2020

(86) PCT No.: PCT/JP2020/041565
§ 371 (c)(1),
(2) Date: Feb. 28, 2022

(87) PCT Pub. No.: WO2021/106525
PCT Pub. Date: Jun. 3, 2021

(65) Prior Publication Data
US 2022/0325795 A1 Oct. 13, 2022

(30) Foreign Application Priority Data
Nov. 28, 2019 (JP) .................................. 2019-215362

(51) Int. Cl.
*F16H 63/34* (2006.01)

(52) U.S. Cl.
CPC ..... *F16H 63/3425* (2013.01); *F16H 63/3466* (2013.01)

(58) Field of Classification Search
CPC .......................... F16H 63/3425; F16H 63/3466
See application file for complete search history.

(56) References Cited

U.S. PATENT DOCUMENTS

| 2009/0314604 A1* | 12/2009 | Reichert | F16H 63/3425 |
| | | | 192/219.5 |
| 2011/0162936 A1* | 7/2011 | Schneider | F16H 63/3425 |
| | | | 192/219.5 |
| 2011/0168519 A1* | 7/2011 | Stauber | F16H 63/3433 |
| | | | 192/219.5 |
| 2021/0285542 A1* | 9/2021 | Sjöqvist | F16H 61/0009 |

FOREIGN PATENT DOCUMENTS

| JP | H5-96626 U | 12/1993 |
| JP | 2000-291797 A | 10/2000 |
| JP | 2012144110 A | * 8/2012 |
| JP | 2014222102 A | * 11/2014 |
| JP | 6292340 B1 | 3/2018 |

* cited by examiner

*Primary Examiner* — Lori Wu
(74) *Attorney, Agent, or Firm* — Foley & Lardner LLP (57) ABSTRACT

A park lock mechanism configured to restrict or allow a rotation of a rotating shaft includes a park pole configured to restrict the rotation of the rotating shaft and having a first inclined surface, and a park wedge having a second inclined surface capable of abutting on the first inclined surface and configured to move the park pole to a lock position that restricts the rotation of the rotating shaft, in which the park pole includes a protrusion protruding from a first side surface on a park wedge side in a moving direction of the park wedge, and the protrusion is formed so as to be continuous with the first inclined surface, and has a third inclined surface capable of abutting on the second inclined surface.

5 Claims, 6 Drawing Sheets

PARK LOCK MECHANISM

TECHNICAL FIELD

The present invention relates to a park lock mechanism.

BACKGROUND ART

JP6292340B discloses a park lock mechanism in which a cam member (park wedge) attached to a parking rod moves in accordance with an operation of an actuator, so that a pole member (park pole) and a parking gear mesh with each other to enter a parking lock state.

SUMMARY OF INVENTION

In the parking lock mechanism described in JP6292340B, when the cam member is to be moved from a position in a parking lock release state to a position in a parking lock state, the cam member may be caught on a side surface of the pole member, and the parking lock mechanism may not be in the parking lock state.

The present invention has been made in view of such technical problems, and an object thereof is to provide a park lock mechanism capable of preventing a park wedge from being caught on a side surface of a park pole.

According to a certain aspect of the present invention, a park lock mechanism configured to restrict or allow a rotation of a rotating shaft includes a park pole configured to restrict the rotation of the rotating shaft and having a first inclined surface, and a park wedge having a second inclined surface capable of abutting on the first inclined surface and configured to move the park pole to a lock position that restricts the rotation of the rotating shaft, in which the park pole includes a protrusion protruding from a first side surface on a park wedge side in a moving direction of the park wedge, and the protrusion is formed so as to be continuous with the first inclined surface, and has a third inclined surface capable of abutting on the second inclined surface.

According to the aspect, since the protrusion having the third inclined surface formed so as to be continuous with the first inclined surface is provided, the park pole can surely ride on the second inclined surface of the park wedge. Accordingly, when the park wedge moves to the lock position, the park wedge can be prevented from being caught on the side surface of the park pole, and the park lock mechanism can be surely set into the park lock state.

DESCRIPTION OF EMBODIMENTS

Hereinafter, embodiments of the present invention will be described with reference to the accompanying drawings.

A park lock mechanism 100 is mounted on, for example, a vehicle (not shown). The park lock mechanism 100 mechanically locks an output shaft 1 of a transmission (not shown) as a rotating shaft when a parking range (P range) is selected.

As shown in FIGS. 1 to 4, the park lock mechanism 100 includes a park gear 10, a park rod 20, a park pole 30, and a park wedge 40. The park gear 10 is fixed to an outer peripheral surface of the output shaft 1 of the transmission, and rotates or stops together with the output shaft 1. A plurality of tooth portions 11 that engage with a claw portion 32 provided on the park pole 30 are provided on an outer edge portion of the park gear 10 at a predetermined interval.

The park rod 20 is formed of a rod-shaped member. The park wedge 40 is attached to a tip of the park rod 20. A base end of the park rod 20 is connected to an actuator (not shown) that operates in response to an operation of a shift lever. As the actuator, for example, a hydraulic actuator or an electric actuator is used.

The park wedge 40 is a columnar member. The park wedge 40 includes, at both ends, a tapered surface 40a as a second inclined surface and a tapered surface 40b that are tapered. The park wedge 40 moves in an axial direction thereof together with the park rod 20 as the actuator operates (see FIGS. 1, 3, and 4).

The park pole 30 is a rod-shaped member having a pair of flat first side surface 30a and second side surface 30b. As shown in FIGS. 1 to 7, the park pole 30 includes a through hole 31 formed on one end side and penetrating the first side surface 30a and the second side surface 30b, the claw portion 32 engaging with the tooth portions 11 of the park gear 10, a protrusion 33 provided on the other end side and formed so as to protrude from the first side surface 30a, a holding portion 34 configured to hold a return spring 50 (see FIG. 2) that biases the park pole 30 in a direction in which the tooth portions 11 of the park gear 10 and the claw portion 32 are disengaged, and an inclined surface 30c (see FIGS. 3 and 4) as a first inclined surface on which the tapered surface 40a of the park wedge 40 abuts.

A support shaft (not shown) that swingably supports the park pole 30 is inserted into the through hole 31.

The claw portion 32 is provided in the vicinity of a center in a longitudinal direction of the park pole 30. When the claw portion 32 enters between the tooth portions 11 of the park gear 10, the tooth portions 11 and the claw portion 32 are engaged with each other. A position where the claw portion 32 is provided is not limited to the vicinity of the center of the park pole 30 in the longitudinal direction.

Figure 6:
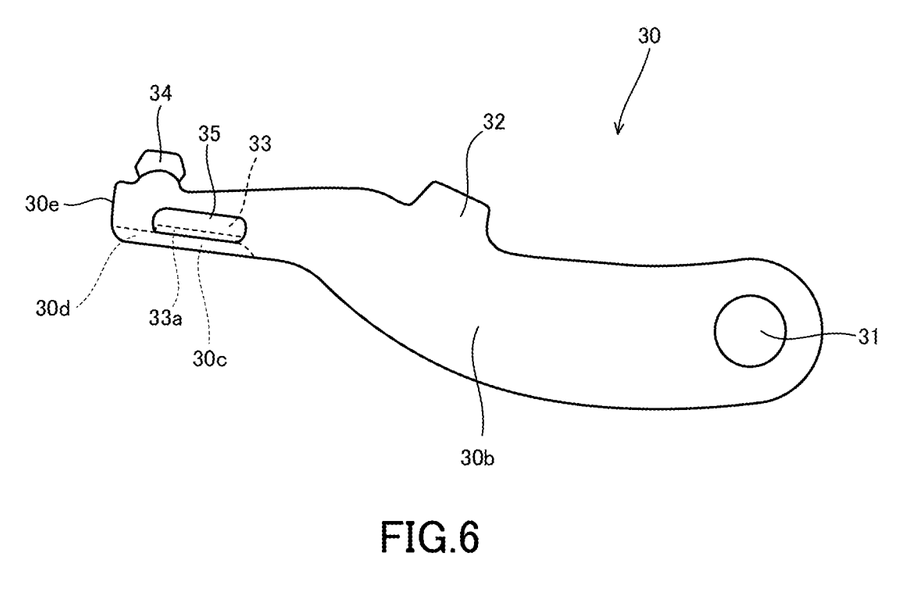
FIG. 6 is a rear view of the park pole according to the embodiment of the present invention.

The protrusion 33 is formed so as to be extruded from the second side surface 30b side toward the first side surface 30a by press working or the like. A recess 35 shown in FIGS. 6 and 7 is a depression formed when the protrusion 33 is formed by the press working.

Figure 2:
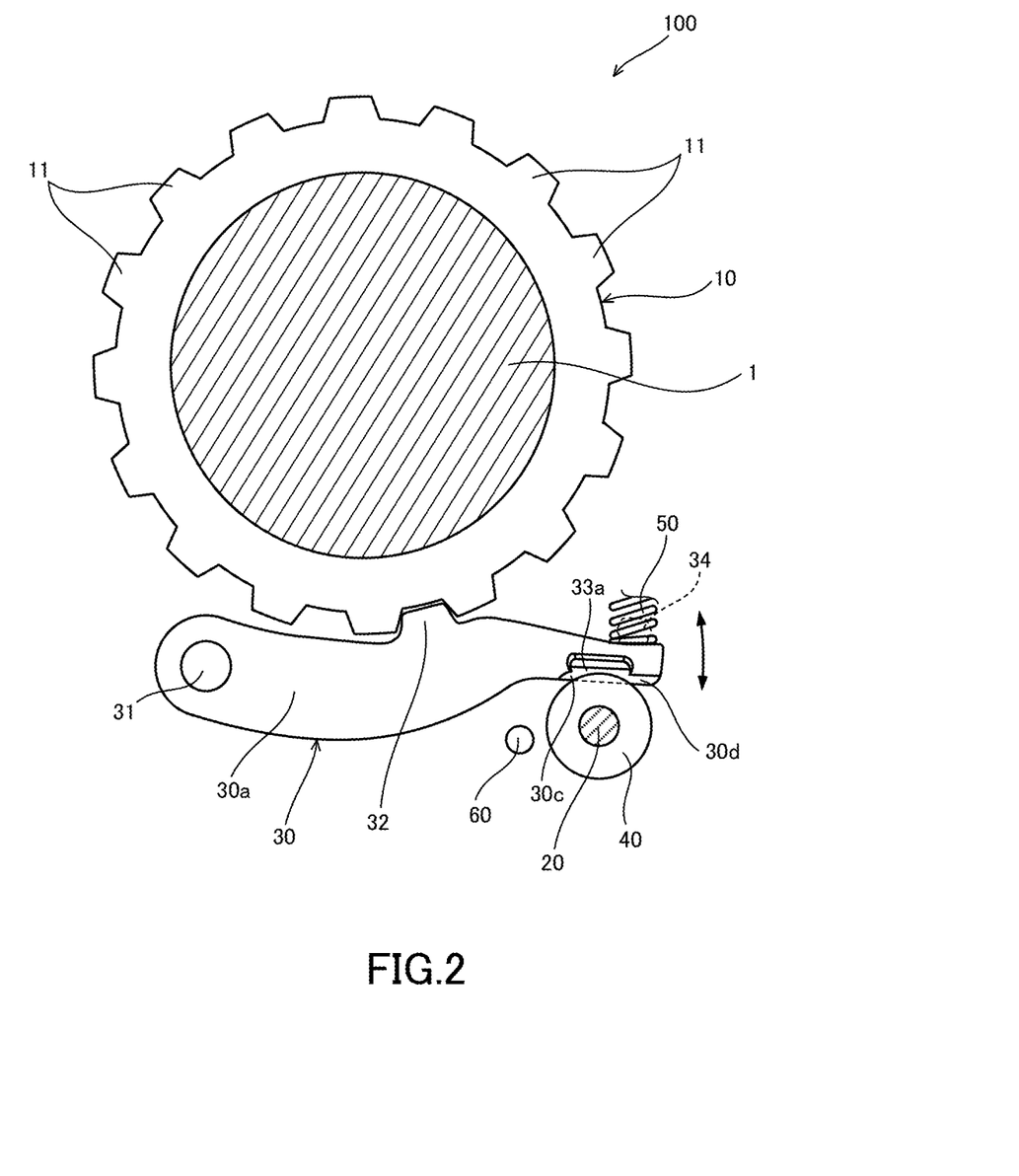
FIG. 2 is a front view showing a schematic configuration of the park lock mechanism in a park lock state according to the embodiment of the present invention.
Figure 5:
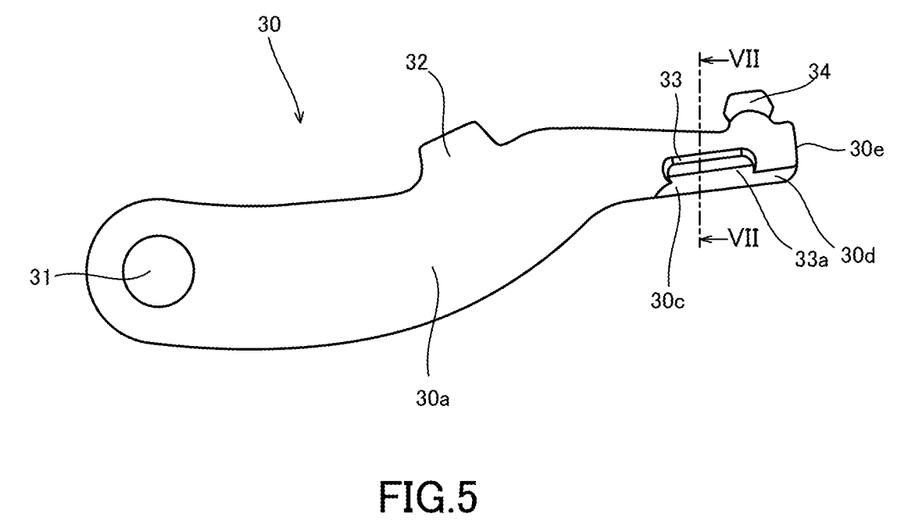
FIG. 5 is a front view of a park pole according to the embodiment of the present invention.
Figure 7:
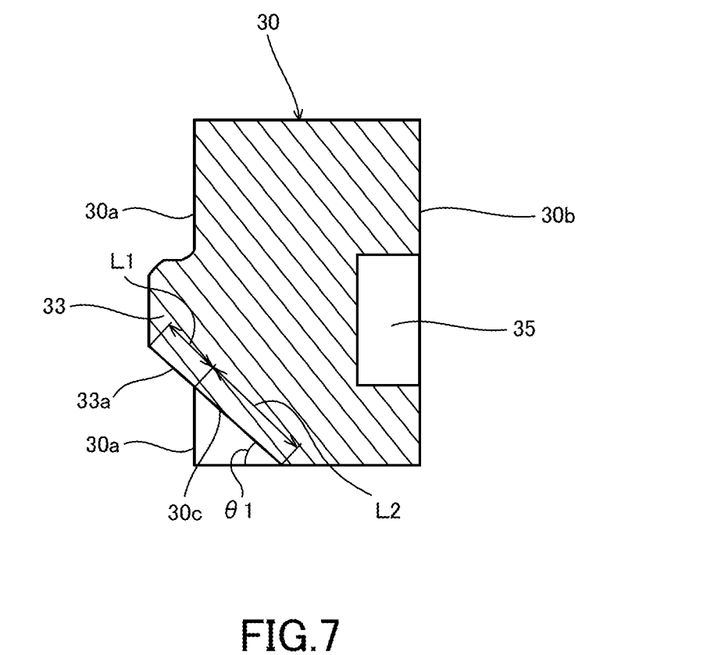
FIG. 7 is a cross-sectional view taken along line VII-VII in FIG. 5.

The protrusion 33 includes an inclined surface 33a as a third inclined surface formed so as to be continuous with the inclined surface 30c and capable of abutting on the tapered surface 40a of the park wedge 40 (see FIGS. 2, 5, and 7). The inclined surface 33a and the inclined surface 30c are formed on the same plane (see FIG. 7 and the like). In the park lock mechanism 100 of the present embodiment, an angle θ1 formed by the inclined surface 33a and an inclined surface 30d and a moving direction of the park wedge 40 is formed to be larger than an angle θ2 formed by the tapered surface 40a of the park wedge 40 and the moving direction of the park wedge 40 (see FIGS. 3 and 7).

The park pole 30 further has the inclined surface 30d as a fourth inclined surface formed so as to be continuous with the inclined surface 30c at a position adjacent to the protrusion 33 on the first side surface 30a (see FIGS. 2 and 5). The inclined surface 30d is formed so as to be flush with the inclined surface 30c and the inclined surface 33a. Since the inclined surface 30d, the inclined surface 30c, and the inclined surface 33a are located on the same plane, they can be formed at the same time by cutting work.

In the park lock mechanism 100 of the present embodiment, a length L1 (see FIG. 7) of the inclined surface 33a along an inclined direction of the inclined surface 33a is formed to be shorter than a length L3 (see FIG. 3) of the tapered surface 40a along an inclined direction of the tapered surface 40a, and a total length of the length L1 of the inclined surface 33a and a length L2 (see FIG. 7) of the inclined surface 30c along an inclination direction of the inclined surface 30c is formed to be longer than the length L3 of the tapered surface 40a.

The park pole 30 swings around the support shaft inserted into the through hole 31 in response to a movement of the park rod 20. When the park pole 30 swings, an engagement state between the tooth portions 11 of the park gear 10 and the claw portion 32 of the park pole 30 is changed. When no external force is applied, the park pole 30 is held at a position (a position shown in FIGS. 1 and 3) where the tooth portions 11 of the park gear 10 and the claw portion 32 of the park pole 30 are disengaged by an baising force of the return spring 50. A movement of the park pole 30 in a disengaging direction is restricted by a stopper 60 (see FIG. 3 and the like).

Next, a specific operation of the park lock mechanism 100 will be described.

Figure 1:
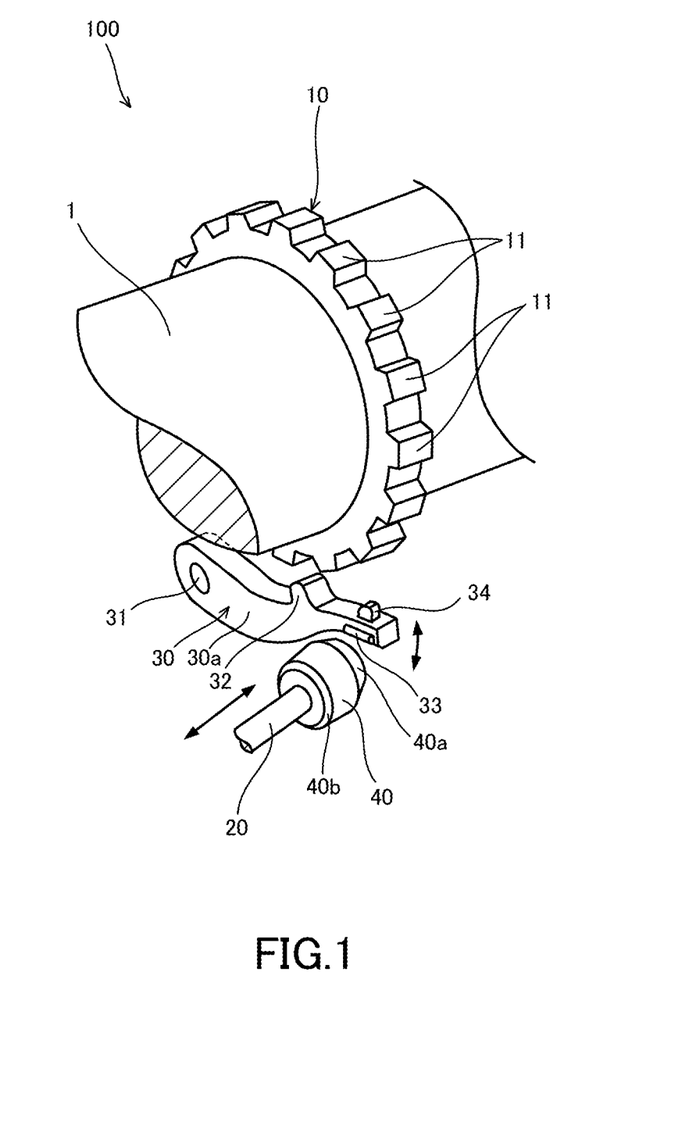
FIG. 1 is a perspective view showing a schematic configuration of a park lock mechanism in a park lock release state according to an embodiment of the present invention.
Figure 3:
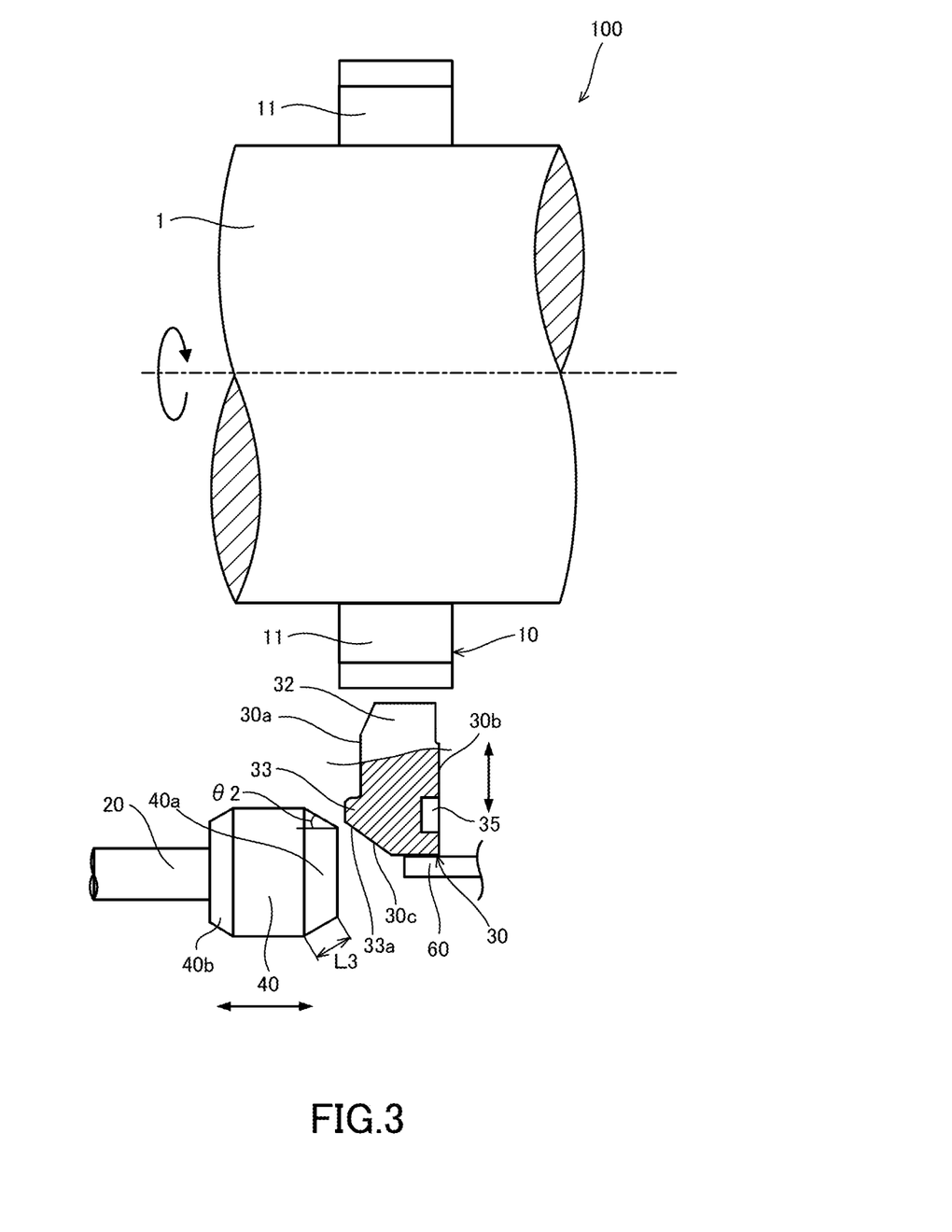
FIG. 3 is a side view showing the schematic configuration of the park lock mechanism in the park lock release state according to the embodiment of the present invention.
Figure 4:
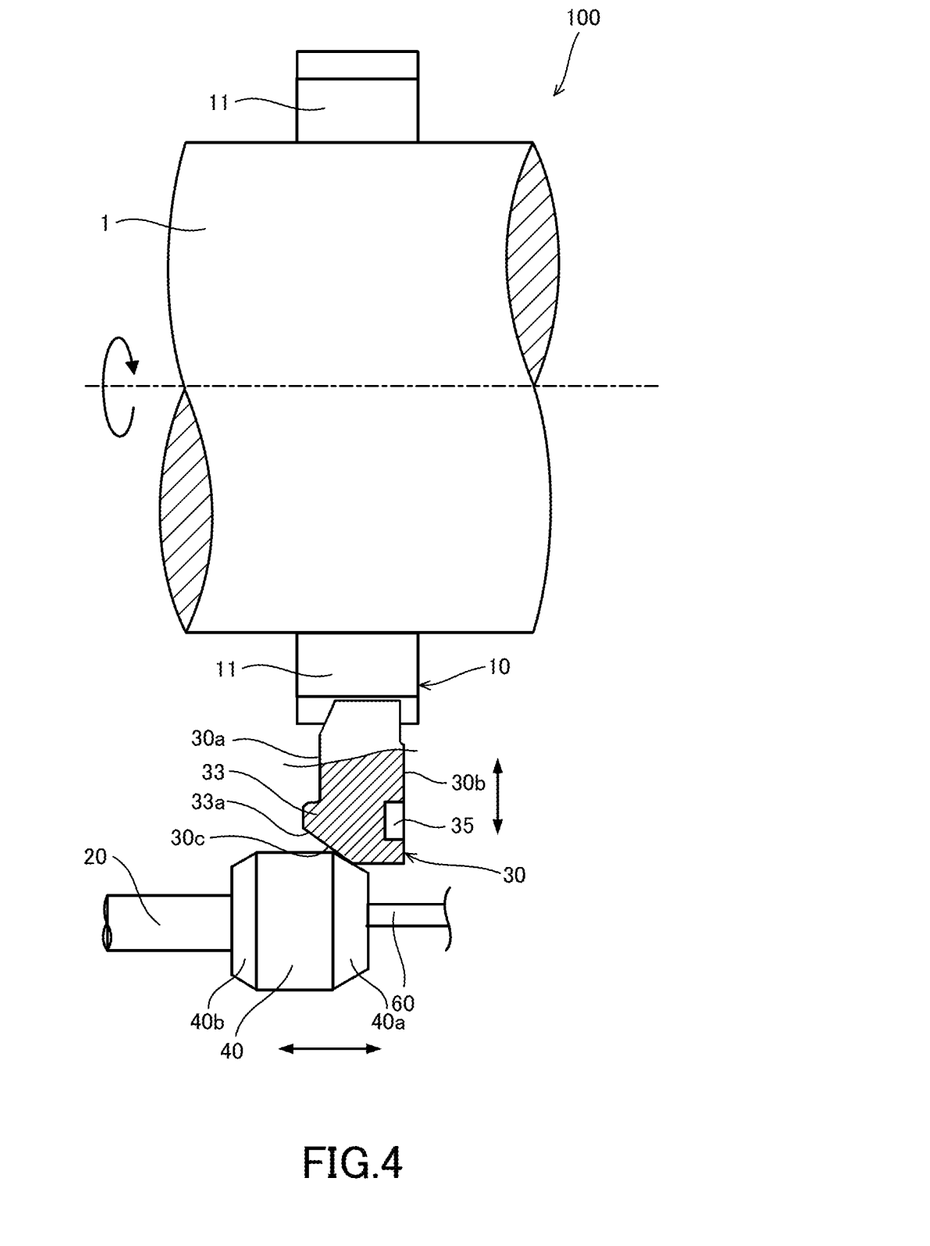
FIG. 4 is a side view showing the schematic configuration of the park lock mechanism in the park lock state according to the embodiment of the present invention.

When the shift lever is in a driving range (D range, R range, etc.) or a neutral range (N range), the engagement between the tooth portions 11 of the park gear 10 and the claw portion 32 of the park pole 30 is released shown in FIGS. 1 and 3 (hereinafter, also referred to as "park lock release state"). In this state, a restriction on a rotation of the output shaft 1 to which the park gear 10 is fixed is released, and the park gear 10 and the output shaft 1 are rotatable. That is, in the park lock release state shown in FIGS. 1 and 3, the vehicle (not shown) is movable.

When the shift lever is switched from the driving range (D range, R range, and the like) or the neutral range (N range) to the parking range (P range), the actuator operates and the park rod 20 and the park wedge 40 move in a direction approaching the park pole 30. The tapered surface 40a of the park wedge 40 abuts on the inclined surface 33a and the inclined surface 30c of the park pole 30 and moves to a position shown in FIG. 4, so that the park pole 30 is pushed up toward the park gear 10. Accordingly, the tooth portions 11 of the park gear 10 and the claw portion 32 of the park pole 30 are engaged with each other (hereinafter, a state in which the tooth portions 11 of the park gear 10 and the claw portion 32 of the park pole 30 are engaged with each other is also referred to as "park lock state"). In the state, the rotation of the output shaft 1 fixed to the park gear 10 is mechanically restricted, and the park gear 10 and the output shaft 1 are not rotatable. That is, in the park lock state shown in FIGS. 2 and 4, a movement of the vehicle (not shown) is restricted.

When the shift lever is switched from the parking range (P range) to the driving range (D range, R range, etc.) or the neutral range (N range), the actuator operates and the park rod 20 and the park wedge 40 move away from the park pole 30. Accordingly, the tapered surface 40a of the park wedge 40 and the inclined surface 33a and the inclined surface 30c of the park pole 30 are separated from each other. The park pole 30 moves in a direction away from the park gear 10 (a lower part in FIGS. 3 and 4) due to the biasing force of the return spring 50. Accordingly, the tooth portions 11 of the park gear 10 and the claw portion 32 of the park pole 30 are disengaged, and are in the park lock release state.

If the park pole 30 does not include the inclined surface 33a, when transitioning from the park lock release state to the park lock state, specifically, when the park wedge 40 moves in the direction approaching the park pole 30, an end face of the park wedge 40 collides with the first side surface 30a of the park pole 30, the park wedge 40 is caught on the first side surface 30a of the park pole 30, and there is a risk that the park lock mechanism 100 cannot be set into the park lock state.

Meanwhile, the park lock mechanism 100 of the present embodiment includes a protrusion 33 protruding from the first side surface 30a on the park wedge 40 side in the moving direction of the park wedge 40, and the protrusion 33 includes the inclined surface 33a capable of abutting on the tapered surface 40a. Accordingly, when the park wedge 40 moves in the direction approaching the park pole 30, the end surface (tapered surface 40a) of the park wedge 40 abuts on the inclined surface 33a, and thus it is possible to prevent the park wedge 40 from being caught on the first side surface 30a of the park pole 30. Therefore, the park pole 30 can surely ride on the tapered surface 40a of the park wedge 40, and the park lock mechanism 100 can be surely set into the park lock state.

In the park lock mechanism 100, the protrusion 33 is provided with the inclined surface 33a capable of abutting on the tapered surface 40a of the park wedge 40, and thus a thickness of the park pole 30 can be shortened as compared with a case where an inclined surface is formed only by the inclined surface 30c, that is, a case where the inclined surface 30c has a length of L1+L2. Accordingly, a weight of the park pole 30 can be reduced.

Figure 8:
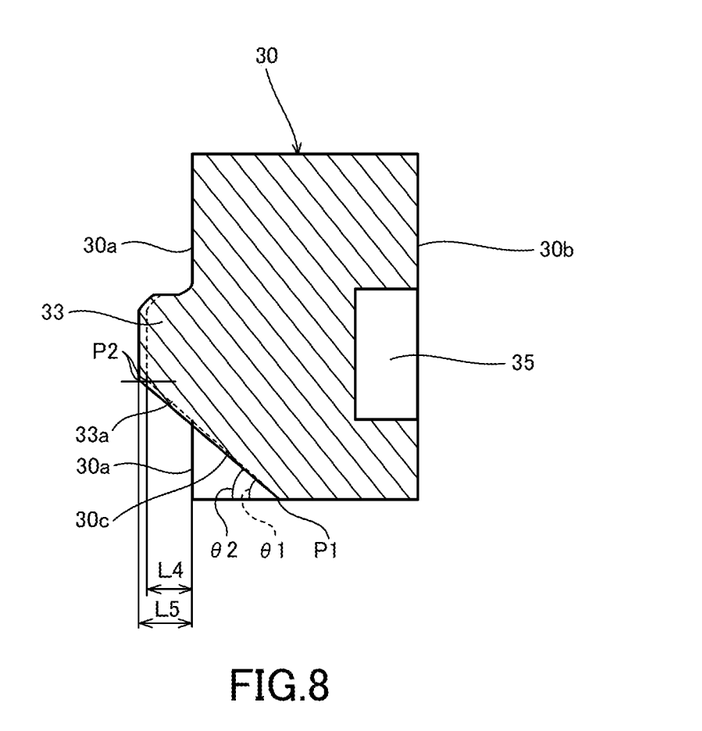
FIG. 8 is a cross-sectional view taken along line VII-VII in FIG. 5 in a modification.

In the above embodiment, a case where the angle θ1 formed by the inclined surface 33a and the inclined surface 30d and the moving direction of the park wedge 40 is larger than the angle θ2 formed by the tapered surface 40a of the park wedge 40 and the moving direction of the park wedge 40 has been described as an example, and the angle θ1 may be equal to the angle θ2. In this case, as shown in FIG. 8, if an end P1 of the inclined surface 30c is set to the same position as in a case of the angle θ1, and an end P2 of the inclined surface 33a in a radial direction of the park wedge 40 is set to the same position, a height of the protrusion 33 is L5, which is higher than a height L4 in the case of the above embodiment. However, by setting the same angle, a contact between the tapered surface 40a of the park wedge 40 and the inclined surface 33a, the inclined surface 30d becomes surface contact, and thus a guide property of the park wedge 40 can be improved.

A configuration, an operation, and an effect of the embodiment of the present invention configured as described above will be collectively described.

(1) The park lock mechanism 100 includes the park pole 30 configured to restrict the rotation of the rotating shaft (output shaft 1) and having the first inclined surface (inclined surface 30c), and the park wedge 40 having the second inclined surface (tapered surface 40a) capable of abutting on the first inclined surface (inclined surface 30c) and configured to move the park pole 30 to a lock position that restricts the rotation of the rotating shaft (output shaft 1), and the park pole 30 includes the protrusion 33 protruding from the first side surface 30a on the park wedge 40 side in the moving direction of the park wedge 40. The protrusion 33 is formed so as to be continuous with the first inclined surface (inclined surface 30c), and has the third inclined surface (inclined surface 33a) capable of abutting on the second inclined surface (tapered surface 40a).

The park lock mechanism 100 includes the protrusion 33 having the third inclined surface (inclined surface 33a) formed so as to be continuous with the first inclined surface (inclined surface 30c), and thus the park pole 30 can surely ride on the second inclined surface (tapered surface 40a) of the park wedge 40. Accordingly, when the park wedge 40 moves to the lock position, the park wedge 40 can be prevented from being caught by the first side surface 30a of the park pole 30, and the park lock mechanism 100 can be surely set into the park lock state.

(2) The park pole 30 includes the recess 35 at a position corresponding to the protrusion 33 on the second side surface 30b opposite to the first side surface 30a.

The protrusion 33 is formed by performing a press molding such that the recess 35 is formed. Accordingly, the protrusion 33 can be easily formed, and thus a cost can be reduced.

(3) The park pole 30 further has the fourth inclined surface (inclined surface 30d) formed so as to be continuous with the first inclined surface (inclined surface 30c) at the position adjacent to the protrusion 33 on the first side surface 30a.

By providing the fourth inclined surface (inclined surface 30d), the park pole 30 can be moved to the park lock position even if the moving direction of the park wedge 40 is inclined.

(4) In the park lock mechanism 100, the total length (L1+L2) of the first inclined surface (inclined surface 30c) and the third inclined surface (inclined surface 33a) is longer than the length L3 of the second inclined surface (tapered surface 40a).

(5) In the park lock mechanism 100, the length L1 of the third inclined surface (inclined surface 33a) is shorter than the length L3 of the second inclined surface (tapered surface 40a).

In these configurations, the guide property of the park wedge 40 can be ensured by the first inclined surface (inclined surface 30c) and the third inclined surface (inclined surface 33a) while the height of the protrusion 33 is lowered.

(6) In the park lock mechanism 100, the angle $\theta 1$ formed by the first inclined surface (inclined surface 30c) and the moving direction of the park wedge 40 is larger than the angle $\theta 2$ formed by the second inclined surface (tapered surface 40a) and the moving direction of the park wedge 40.

By making the angle $\theta 1$ larger than the angle $\theta 2$, the height of the protrusion 33 (length of the protrusion 33 in the moving direction of the park wedge 40) can be made lower than a case where the angle $\theta 1$ and the angle $\theta 2$ are equal.

The above describes an embodiment of the present invention, however the above embodiment merely illustrates one portion of an application example of the present invention, and does not intend to limit the technical range of the present invention to the specific configurations in the above embodiment.

In the above embodiment, the return spring 50 is used, but the park pole 30 may be held in the park lock release position by an own weight instead of using the return spring 50.

In the above embodiment, the shift lever has been described as an example, but a shift range may be switched by a select switch or a momentary switch. The park rod 20 may be directly connected to the shift lever by, for example, a link without using the actuator.

In the above embodiment, a case where the moving direction of the park wedge 40 is substantially orthogonal to the longitudinal direction of the park pole 30 has been described as an example, but the present invention is not limited to this, and for example, the moving direction of the park wedge 40 may be parallel to the longitudinal direction of the park pole 30. In the case, the protrusion 33 may be provided on a third side surface 30e (see FIGS. 5 and 6) of the park pole 30.

This application claims priority based on Japanese Patent Application No. 2019-215362 filed with the Japan Patent Office on Nov. 28, 2019, the entire contents of which are incorporated into this specification.

The invention claimed is:

1. A park lock mechanism configured to restrict or allow a rotation of a rotating shaft, comprising:
   a park pole configured to restrict the rotation of the rotating shaft and having a first inclined surface; and
   a park wedge having a second inclined surface capable of abutting on the first inclined surface and configured to move the park pole to a lock position that restricts the rotation of the rotating shaft, wherein
   the park pole includes a protrusion protruding from a first side surface on a park wedge side in a moving direction of the park wedge,
   the protrusion is formed so as to be continuous with the first inclined surface, and has a third inclined surface capable of abutting on the second inclined surface, and
   the park pole includes a recess at a position corresponding to the protrusion on a second side surface opposite to the first side surface.

2. The park lock mechanism according to claim 1, wherein
   a total length of the first inclined surface and the third inclined surface is longer than a length of the second inclined surface.

3. The park lock mechanism according to claim 1, wherein
   an angle formed by the first inclined surface and the moving direction of the park wedge is larger than an angle formed by the second inclined surface and the moving direction of the park wedge.

4. A park lock mechanism configured to restrict or allow a rotation of a rotating shaft, comprising:
   a park pole configured to restrict the rotation of the rotating shaft and having a first inclined surface; and
   a park wedge having a second inclined surface capable of abutting on the first inclined surface and configured to move the park pole to a lock position that restricts the rotation of the rotating shaft, wherein
   the park pole includes a protrusion protruding from a first side surface on a park wedge side in a moving direction of the park wedge,
   the protrusion is formed so as to be continuous with the first inclined surface, and has a third inclined surface capable of abutting on the second inclined surface, and the park pole further has a fourth inclined surface formed so as to be continuous with the first inclined surface at a position adjacent to the protrusion on the first side surface.

5. A park lock mechanism configured to restrict or allow a rotation of a rotating shaft, comprising:
- a park pole configured to restrict the rotation of the rotating shaft and having a first inclined surface; and
- a park wedge having a second inclined surface capable of abutting on the first inclined surface and configured to move the park pole to a lock position that restricts the rotation of the rotating shaft, wherein
- the park pole includes a protrusion protruding from a first side surface on a park wedge side in a moving direction of the park wedge,
- the protrusion is formed so as to be continuous with the first inclined surface, and has a third inclined surface capable of abutting on the second inclined surface,
- the third inclined surface comes into contact with the second inclined surface before the first inclined surface when transitioning from the park lock release state to the park lock state, and
- a length of the third inclined surface is shorter than a length of the second inclined surface.

* * * * *